Sept. 17, 1929.    A. I. MARCUM    1,728,869
DOUBLE REDUCTION COMPENSATING THROUGH DRIVE AXLES
Filed July 22, 1926    2 Sheets-Sheet 1

Inventor
Arthur I. Marcum
By William A. Strauch
Attorney

Sept. 17, 1929.   A. I. MARCUM   1,728,869
DOUBLE REDUCTION COMPENSATING THROUGH DRIVE AXLES
Filed July 22, 1926   2 Sheets-Sheet 2
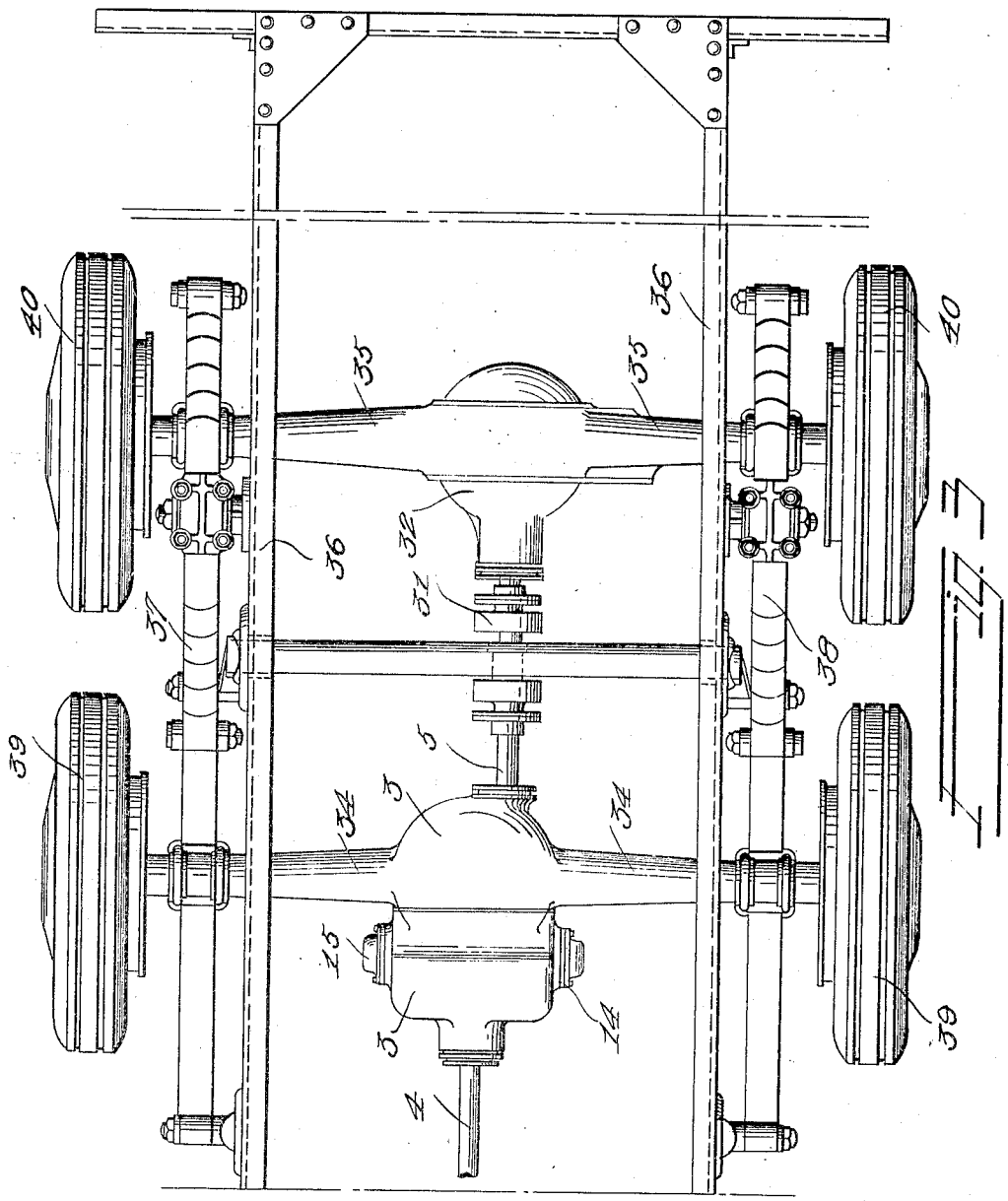
Inventor
Arthur I. Marcum
By William I. Strauch
Attorney Patented Sept. 17, 1929

1,728,869

UNITED STATES PATENT OFFICE

ARTHUR I. MARCUM, OF OAKLAND, CALIFORNIA, ASSIGNOR TO EMORY WINSHIP, OF MACON, GEORGIA

DOUBLE REDUCTION COMPENSATING THROUGH DRIVE AXLES

Application filed July 22, 1926. Serial No. 124,159.

This invention relates to a vehicle drive axle construction of the type designed for use in connection with tandem driven axles carrying wheels, every one of which is differentially driven with respect to every other.

It is the principal object of this invention to provide an axle construction especially adapted for use in trucks designed to carry heavy loads at comparatively slow speeds. To this end, a construction is provided that embodies a double reduction in the speed of the propeller shaft.

A further object of the invention is to provide a drive arrangement for tandem axles, that are differentially driven, and embodying double reduction gearing, that is simple in design and in which the necessarily large number of parts are arranged in narrow compass so that the center of gravity of the vehicle can be kept as low as possible.

A still further object of the invention is to arrange the reduction gearing and third differential in the same load supporting casing that carries one of the axles of the vehicle, and on a shaft in that casing that is parallel to the axle shaft, providing a construction that is comparatively inexpensive to produce.

A still further object of the invention is to support the through drive shaft section in the same casing and in parallelism to the propeller shaft section likewise supported in said casing.

Further objects of the invention will appear as the description proceeds with reference to the accompanying drawings, in which, Figure 1 is an elevation view, partly in section, of my improved axle.

Figure 3 is a plan view of the rear portion of a vehicle embodying the improved drive axle of this invention.

Like reference characters indicate like parts throughout the several figures.

Figure 1:
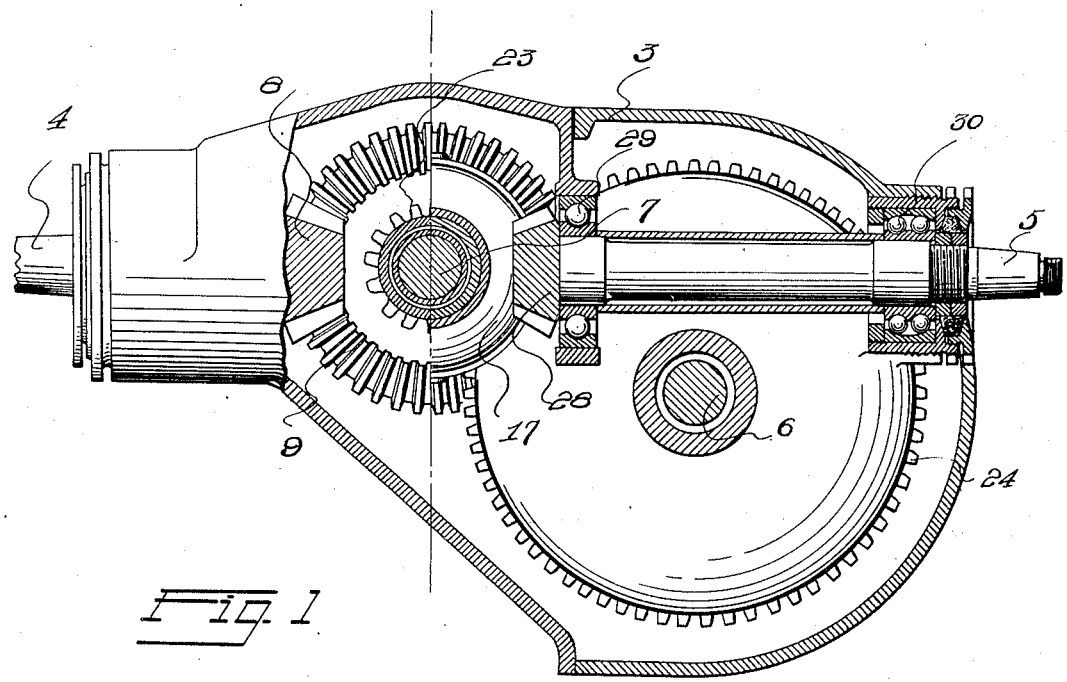
Figure 2:
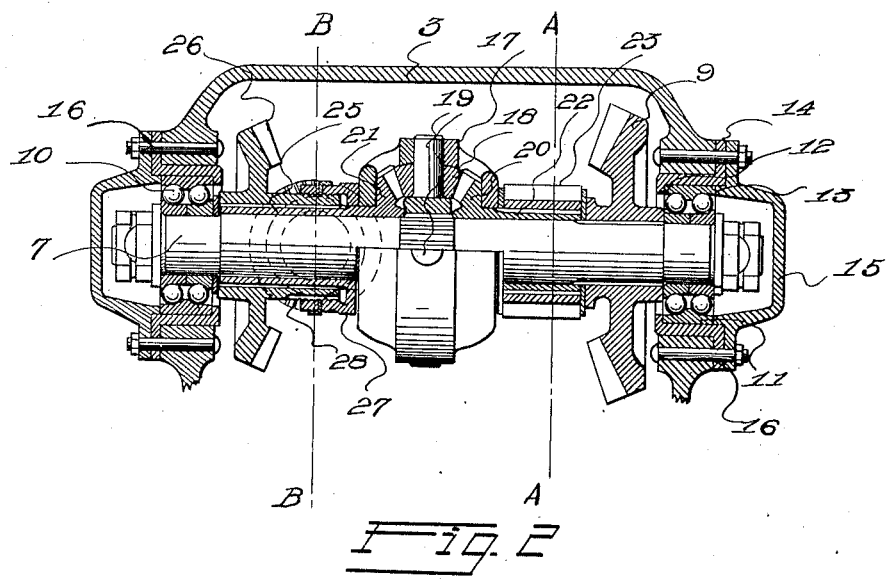
Figure 2 is a central longitudinal section through the counter shaft that carries the third differential and the reducing gears.

The load supporting casing in which the improved construction is arranged is indicated by numeral 3. It carries the drive or propeller shaft 4, the intermediate or through shaft section 5, that is connected to the other driven axle, the driven axle 6, which is made in sections that are differentially driven through a differential mechanism mounted on said axle, and the countershaft 7.

Drive shaft 4 is journaled in casing 3 and carries a bevel gear 8 at its inner end. Gear 8 meshes with a larger bevel gear 9 keyed to countershaft 7. It will be observed that countershaft 7 extends parallel to axle 6 and is supported on roller bearings 10 and 11 supported in the casing in any well known manner. In the arrangement shown the roller bearings are arranged between shoulders 12 and 13 provided on ring 14 and cap 15 that are secured to the casing by bolts 16.

Splined on countershaft 7 intermediate its ends is a differential housing 17, carrying a number, preferably four, bevel gears 18 journaled on pins 19 carried by said housing. Arranged within the differential housing to engage opposite sides of gears 18 are differential gears 20 and 21.

Gear 20 is provided with an elongated hub 22 surrounding shaft 7 and having keyed to it externally a spur pinion 23. Pinion 23 engages a large spur ring gear 24, that is secured to the differential housing on axle 6, effecting at this point a second reduction in the speed at which the axle is driven.

Gear 21 is likewise provided with an extended hub 25 in the form of a sleeve surrounding counter shaft 7. Keyed to said hub is a bevel gear 26 carrying an internally threaded spacing sleeve 27, the edge of which contacts with differential housing 17.

Gear 26 meshes with a gear 28 carried by through shaft section 5, that is journaled in casing 3, out of alignment with drive shaft 4, by roller bearings 29 and 30 or in any other suitable manner. Shaft 5 serves to differentially transmit the power of the drive shaft at reduced speed to the rear driven axle, through a flexible and extensible shaft 31 extending into the housing 33 of said rear axle.

Housings 3 and 32 are provided with tubular extensions 34 and 35 respectively in which the drive axle sections are journalled in known manner. Said extensions, adjacent each side of the vehicle, are connected to the frame 36 of the vehicle by spring suspensions 37 and 38 of approved form disposed at opposite sides of the frame and serving to resiliently support the frame on said extensions. Pairs of wheels 39 and 40 support the drive axles in such manner.

The invention has been above described in considerable detail. It should be understood, however, that my invention does not reside in said details, but that the scope thereof is to be determined from the following claims.

What I claim as new is:

1. A vehicle drive axle comprising a load supporting casing, a drive shaft, a through shaft section arranged with its axis in the horizontal plane containing the axis of the drive shaft, an axle and a countershaft arranged substantially parallel thereto and rotatably journaled in said casing, a differential mechanism and reducing gearing mounted on said countershaft, said mechanism and gearing serving to transmit the power of the drive shaft differentially at reduced speed to said through shaft section and to said axle.

2. A vehicle drive axle comprising a casing, a drive shaft and a through shaft section journaled in the casing with their axes in parallel relation, a counter shaft journaled in the casing with its axis at right angles to said first named axes, an axle, and differential mechanism on said countershaft for differentially driving said axle and said through shaft section.

3. A vehicle drive for use in a vehicle having tandem driven axles, including a load supporting casing, one of said axles being journaled in said casing, a through shaft section for said other axle journaled in said casing, a counter shaft arranged parallel to said first named axle and journaled in the casing, and a differential mechanism arranged on said counter shaft and designed to differentially transmit the power of the driven shaft through said through shaft section to said other axle.

4. The combination defined in claim 3 in which the counter shaft is arranged parallel to the axle carried by the casing.

5. The combination defined in claim 3 in which the counter shaft carries speed reducing gearing in addition to the differential mechanism.

6. A vehicle drive for use in a vehicle having tandem driven axles including a load supporting casing, an axle journaled in said casing, a drive shaft and a through shaft arranged to be connected to the other driven axle, said shafts being journaled in said casing with their axes in substantially the same horizontal plane, a countershaft journaled in said casing for rotation on an axis substantially parallel to the axis of the axle journaled therein, a differential mechanism mounted on said countershaft and operatively connected to said drive shaft and gears arranged on said counter shaft, and differentially driven by said differential mechanism, and gears being operatively connected to said through drive shaft and to the axle journaled in said casing.

7. A vehicle drive for use in a vehicle having tandem driven axles comprising a load supporting casing, a drive shaft, and a through shaft journaled in said casing with their axes in the same horizontal plane but out of alignment with each other in said plane, a countershaft arranged with its axis in the same horizontal plane and extending transversely to and between said shafts, an axle journaled in said casing with its axis substantially parallel to the axis of the countershaft, and a differential mechanism and gearing arranged on said countershaft, said differential mechanism and gearing being so disposed as to differentially transmit the power of the drive shaft to said axle journaled in the casing and to said through drive shaft.

In testimony whereof I affix my signature.

ARTHUR I. MARCUM.